United States Patent [19]

Rucinski

[11] 4,114,280
[45] Sep. 19, 1978

[54] DIGITAL ELECTRONIC INDICATOR

[75] Inventor: David W. Rucinski, Rochester, N.Y.

[73] Assignee: Quality Measurement Systems, Inc., Penfield, N.Y.

[21] Appl. No.: 791,506

[22] Filed: Apr. 27, 1977

[51] Int. Cl.² ............................ G01B 5/20; H01J 3/38
[52] U.S. Cl. .................................. 33/172 E; 73/432 A
[58] Field of Search .................. 73/432 A; 33/172 E, 33/172 R, 125 C, 125 A, 1 L; 250/237 G

[56] References Cited

U.S. PATENT DOCUMENTS

| 1,728,626 | 9/1929 | Pairman | 33/172 R X |
| 3,131,483 | 5/1964 | Koenig | 33/125 A X |
| 3,816,929 | 6/1974 | Kiffe et al. | 33/172 E |
| 3,991,477 | 11/1976 | Zipin et al. | 33/172 E |

FOREIGN PATENT DOCUMENTS 860,138  2/1961  United Kingdom .................. 33/172 R

*Primary Examiner*—Daniel M. Yasich

*Attorney, Agent, or Firm*—Stonebraker, Shepard & Stephens

[57] ABSTRACT

An indicator is made to fit within American Gauge Design dimension requirements to be compatible with existing accessories for indicators and still have a spindle with a travel of about ½ inch cooperating with an electro-optical, digital electronic measurement and readout system. A coupling is secured to the inner end of the spindle and supports a ruled glass scale for movement with the spindle in an axially offset position to move relative to a reader assembly that is mounted in the housing. A connecting arm is secured to the coupling for movement in a region spaced from the scale, a lifter rod is arranged opposite the spindle, and a lifter arm is connected between the lifter rod and the connecting arm so that the lifter rod moves about one-half the distance of the spindle. The connecting arm also prevents rotation of the spindle to maintain the orientation of the scale relative to the reader assembly.

8 Claims, 3 Drawing Figures

DIGITAL ELECTRONIC INDICATOR

BACKGROUND OF THE INVENTION

American Gauge Design has established some standard dimensions for dial indicators for many years, and these include minimum and maximum diameters for a generally cylindrical housing, the dimensions of a bushing supporting the movable spindle, and the dimensions of a back mounting plate relative to the spindle bushing and lifter rod. Dimensional standardization for these components of indicators allows the industry to use clamps, mounts, and holders that can fix different indicators in place for different measurements, and a big investment has already been made in such devices.

Prior art indicators ordinarily use a rack-and-pinion drive for a pointer movable around a dial as the spindle moves relative to the housing, and there are many inherent inaccuracies and problems relative to such an arrangement. Electro-optical measuring systems using optically ruled glass scales and detectable moire fringe patterns are also generally known, and these are substantially more accurate and reliable than rack-and-pinion dial indicators. The invention seeks to use the improved accuracy and reliability of electro-optical measuring systems in an instrument that meets American Gauge Design dimensions requirements so as to be compatible with existing clamps, mounts, and holders. This creates dimensional problems if the spindle is to travel a substantial distance, because the required components for an electro-optical measuring system cannot be readily fit within the established dimensions for present dial indicators and allow much room for spindle travel.

The invention solves this problem with a special arrangement of components for an electro-optical measuring system within the established dimensional requirements for indicators while still providing a spindle travle of at least about ½ inch. The invention also aims at economy and reliability in meeting all the needs for an accurate electro-optical measuring system fitted within the present dimensional limitations of an indicator.

SUMMARY OF THE INVENTION

The invention indicator has a spindle with a substantial travel of at least about ½ inch and has a generally cylindrical housing meeting current American Gauge Design dimension requirements for diameter, spindle bushing, and back mounting plate so as to be compatible with existing clamps, mounts, and holders for existing indicators. A coupling is secured to the inner end of the spindle within the housing to be movable directly with the spindle, and a ruled glass scale is secured to the coupling for direct movement with the spindle within the housing in a region axially offset from the spindle movement. A reader assembly is mounted in the housing so that the scale moves relative to the reader assembly, which electro-optically detects scale movement and cooperates with electronic circuitry and a digital display for indicating positions of the spindle relative to the housing. A connecting arm is secured to the coupling for movement in a region spaced from the scale movement, a lifter rod is arranged diametrically opposite the spindle, and a lifter arm is connected to the lifter rod and to the connecting arm to be movable in a region spaced from the scale movement so that relatively shorter movement of the lifter rod moves the spindle for relatively longer movement. A spring is arranged for biasing the spindle outward from the housing, and the connecting arm and lifter arm are preferably both pivotally mounted.

DRAWINGS

DETAILED DESCRIPTION

Figure 1:
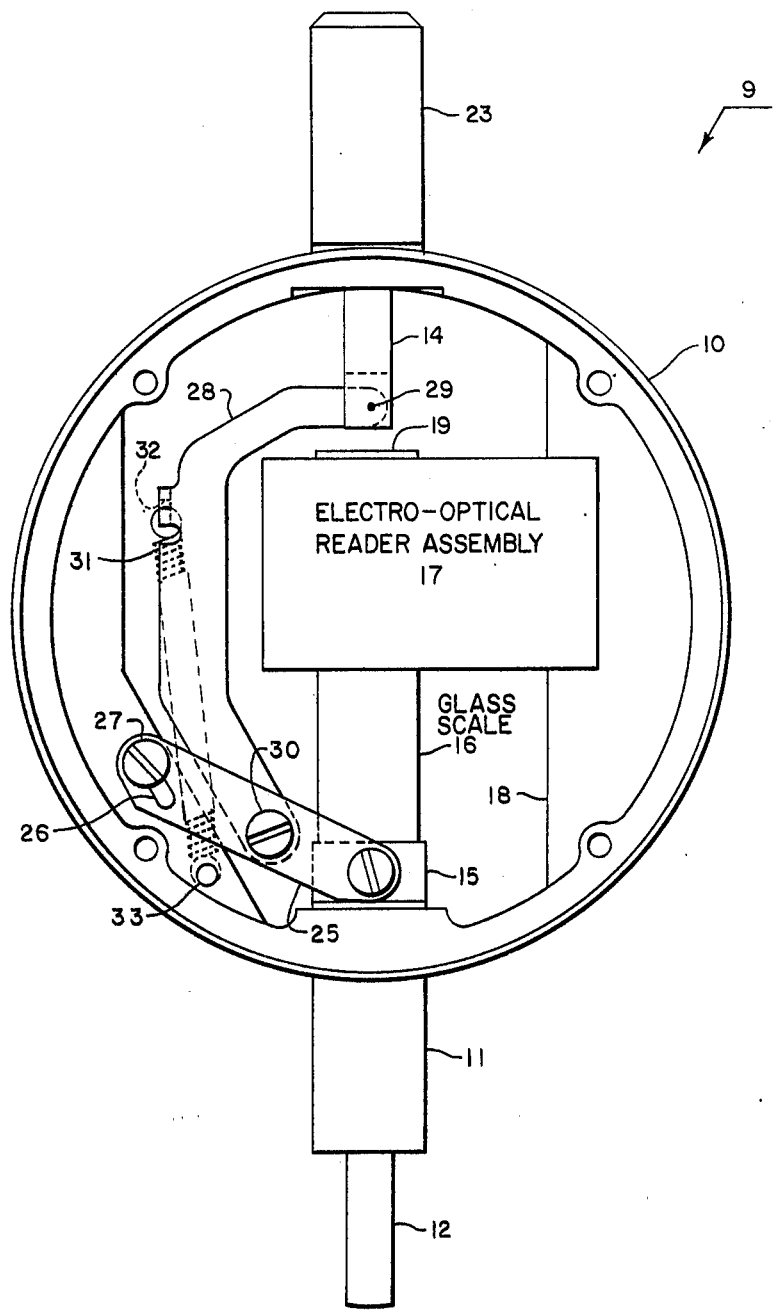
FIG. 1 is a rear elevational view of a preferred embodiment of the inventive indicator with the rear mounting plate removed and the spindle extended.

The preferred indicator 9 according to the invention fits within a housing 10 that is generally cylindrical and meets American Gauge Design dimension requirements in several respects. These include maximum and minimum housing diameter, the size and location of bushing 11 supporting movable spindle 12 relative to back mounting plate 13, and the location of lifter rod 14 diametrically opposite spindle 12. The inventive indicator 9 preferably also meets American Gauge Design specifications in other respects so that it is compatible with existing clamps, mounts, and holders for fixing existing indicators in working positions. The inventive instrument contains an electro-optical measuring system arranged within housing 10 as explained more fully below.

Figure 3:
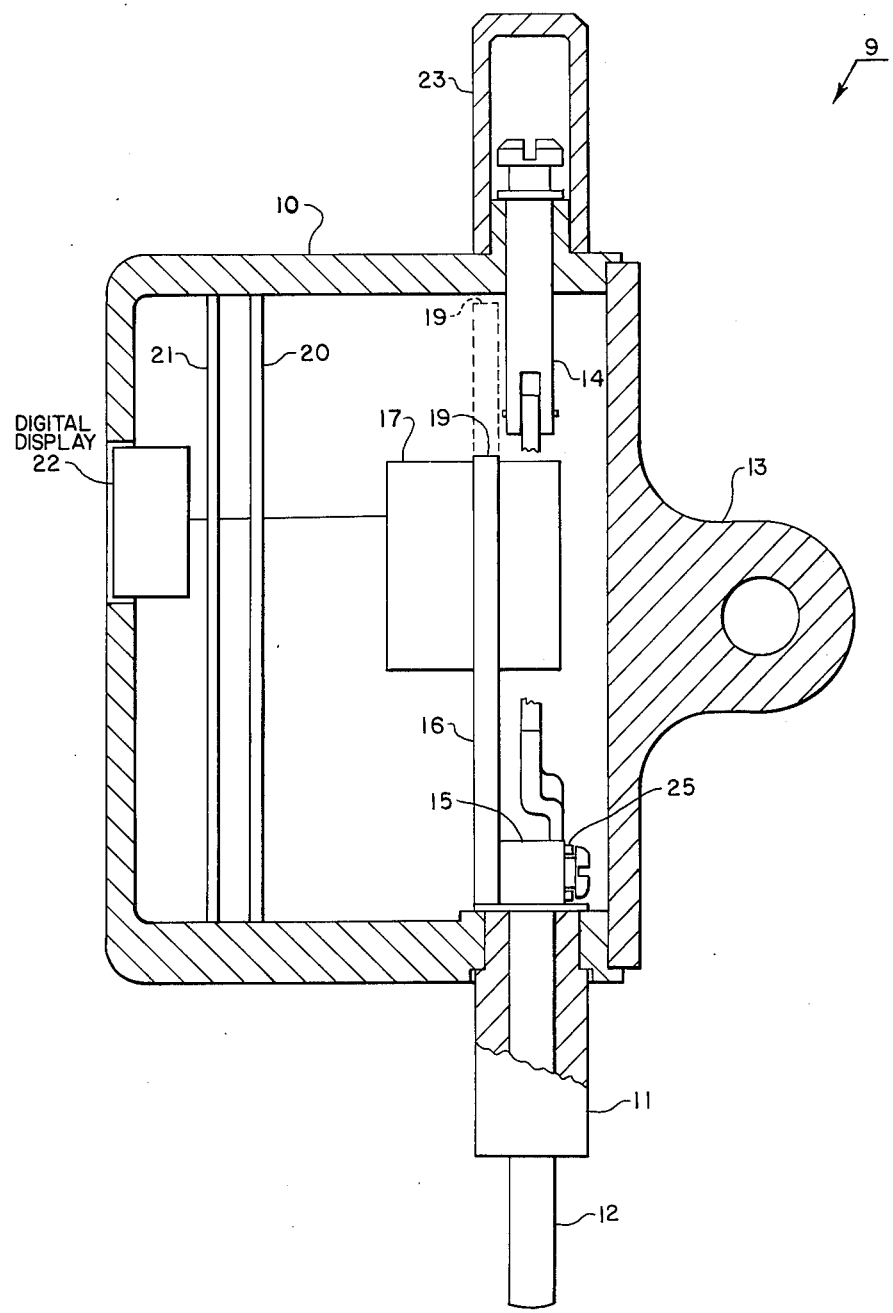
FIG. 3 is a cross-sectional side view of the indicator of FIGS. 1 and 2 with a rear mounting plate in place.

A coupling 15 is secured to the inner end of spindle 12 within housing 10, and an optically ruled glass scale 16 is secured to coupling 15. Scale 16 is axially offset from the axis or region of movement of spindle 12 as best shown in FIG. 3, to move back and forth between the solid- and broken-line positions of FIG. 3 in a region that is out of the way of the travel of both spindle 12 and lifter rod 14. This gives scale 16 the maximum possible travel relative to reader assembly 17 that is fixed to a mounting wall 18 in housing 10. The free end 19 of scale 16 extends just past reader assembly 17 when spindle 12 is fully extended, and moves to the proximity of the inside of housing 10 when scale 12 is fully retracted. Considering the minimum space required by reader assembly 17 and coupling 15, the movement of scale 16 and spindle 12 for about ½ inch of travel is a practical maximum for the diameter of housing 10.

Reader assembly 17 includes another optical ruled scale as is generally known, together with light sources and light detectors for producing moire fringes as scale 16 moves. These fringes are detected by reader assembly 17 and processed by electronic circuit elements 20 and 21 to actuate digital display 22 in a generally known way for indicating positions of spindle 12 relative to housing 10. Electronic circuitry and a digital display unit cooperating with reader assembly 17 can also be arranged in a remote location. Examples of electro-optical systems using moire fringes for measurement purposes are shown in U.S. Pat. Nos. 2,886,717 and 4,037,325.

Lifter rod 14 of raising or retracting spindle 12 is generally known in the indicator art and is convenient for many indicator uses. It is arranged under a protective cover or cap 23 that is also generally known and is removed for operating lifter rod 14 in various known ways.

Figure 2:
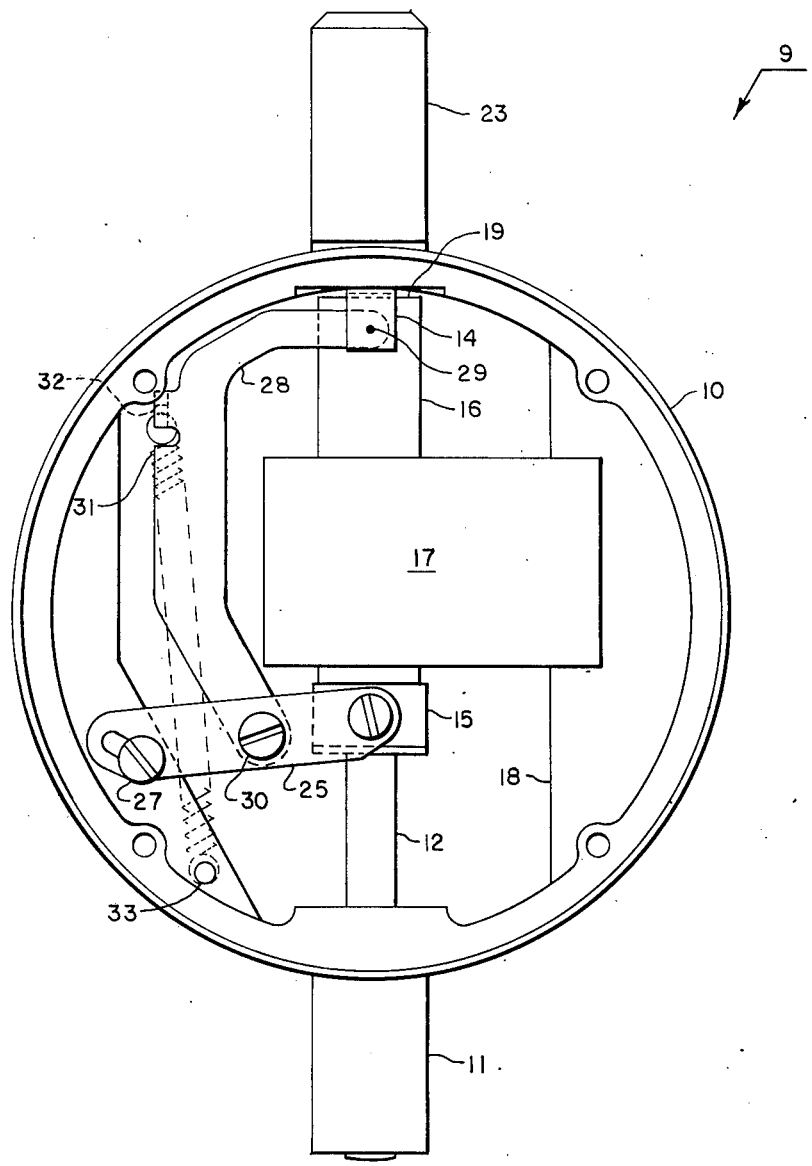
FIG. 2 is a rear elevational view of the inventive indicator similar to the view of FIG. 1, with the spindle retracted.

A connecting arm 25 is pivotally connected to coupling 15 and has an oblong slot 26 for pivotally sliding on pin 27 that is fixed to housing 10. Connecting arm 25 moves pivotally with coupling 15 and spindle 12 as best shown in FIGS. 1 and 2, and is secured to the opposite side of coupling 15 from glass scale 16 to be spaced across the axis of spindle 12 from scale 16. A lifter arm 28 is connected to the clevis end of lifter rod 14 by a clevis pin 29, and lifter arm 28 extends around reader assembly 17 in a generally curved shape to a pivotal connection with connecting arm 25 at pin 30. Lifter arm 28 is connected to a midregion of connecting arm 25 so that lifter rod 14 moves only a portion of the distance moved by spindle 12. In the illustrated instrument, lifter rod 14 moves through a total travel of about ¼ inch while spindle 12 and scale 16 move about ½ inch so that the ratio of travel between lifter rod 14 and spindle 12 is 1:2. Different ratios of travel between lifter rod 14 and spindle 12 can be used if desired. A tension spring 31 extends between a projection 32 on lifter arm 28 and a pin 33 on housing 10 for biasing lifter arm 28, connecting arm 25, and spindle 12 outward toward an extended position relative to housing 10.

Connecting arm 25 secured to coupling 15 on the opposite side of the spindle axis from scale 16 prevents rotation of spindle 12 and corresponding rotation or tilting of scale 16, because of the pivotal connection of arm 25 to housing 10 at pin 27. This prevents inaccuracies that might otherwise result from tilting of scale 16 relative to reader assembly 17. At the same time, connecting arm 25 provides an advantageous connection with lifter rod 14 via lifter arm 28 for proportional movement in lifting or retracting spindle 12 against the bias of spring 31 with a relatively small movement of lifter rod 14.

The preferred indicator shown in the drawings combines maximum spindle travel with the reliability, sensitivity and accuracy of an electro-optical measuring system and still fits within standard indicator dimensions. It is fully compatible with existing equipment for mounting indicators in working positions and yet provides substantially improved measuring results and a more convenient display. Workers skilled in the art of measuring instruments will appreciate these features and the variations in the ways they can be achieved according to the invention.

I claim:

1. An indicator having a spindle with a substantial travel of at least about ½ inch and having a generally cylindrical housing meeting current Americal Gauge Design dimension requirements for diameter, spindle bushing, and back mounting plate, said indicator comprising:

a. a coupling secured to the inner end of said spindle within said housing to be movable directly with said spindle;
   b. a ruled glass scale secured to said coupling for direct movement with said spindle in a region within said housing axially offset from the region of movement of said spindle;
   c. a reader assembly mounted in said housing so that said scale is movable relative to said reader assembly to produce moire fringes that are electro-optically detected by said reader assembly;
   d. a digital display cooperatively responsive to said reader assembly for indicating positions of said spindle relative to said housing;
   e. a connecting arm secured to said coupling for movement in a region spaced from said movement region of said scale;
   f. a lifter rod arranged diametrically opposite said spindle and coaxial with said spindle in a position spaced from said movement region of said scale;
   g. a lifter arm connected to said lifter rod and to a midregion of said connecting arm and movable in a region spaced from said movement region of said scale so that movement of said lifter rod is transmitted through said lifter arm and said connecting arm to amplify movement of said spindle; and
   h. a spring arranged for biasing said spindle outward from said housing.

2. The indicator of claim 1 wherein said spring is tensioned between said housing and an element of said indicator that is movable relative to said housing.

3. The indicator of claim 1 wherein said connecting arm is pivotally mounted between said coupling and said housing.

4. The indicator of claim 3 wherein said lifter rod moves about one-half the movement of said spindle.

5. The indicator of claim 3 wherein said spring is tensioned between said housing and an element of said indicator that is movable relative to said housing.

6. The indicator of claim 1 wherein said scale and said connecting arm are secured to said coupling on opposite sides of the axis of said spindle.

7. The indicator of claim 6 wherein said connecting arm is pivotally mounted between said coupling and said housing.

8. The indicator of claim 7 wherein said spring is tensioned between said housing and an element of said indicator that is movable relative to said housing.

* * * * *